May 7, 1963  M. S. LIPKINS  3,088,254
SPHERICAL CUTTING METHOD
Filed Feb. 26, 1960
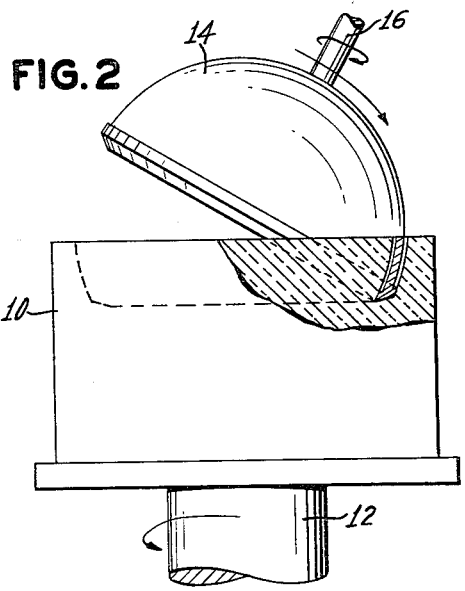
FIG. 2
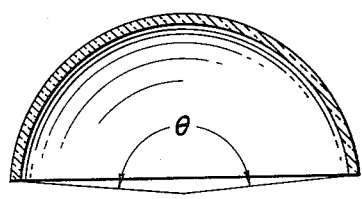
FIG. 1
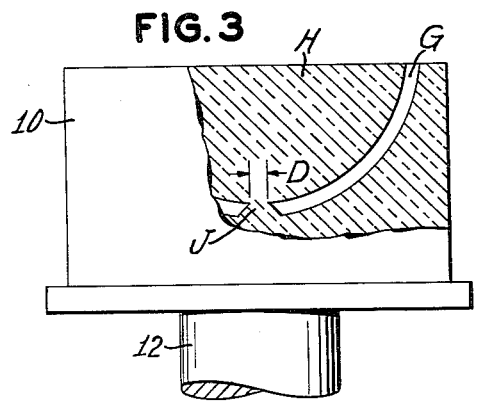
FIG. 3
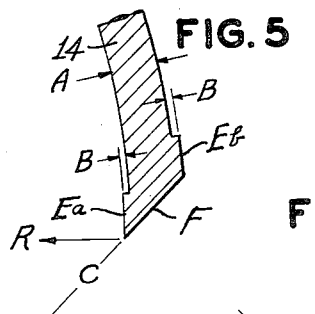
FIG. 5
FIG. 6
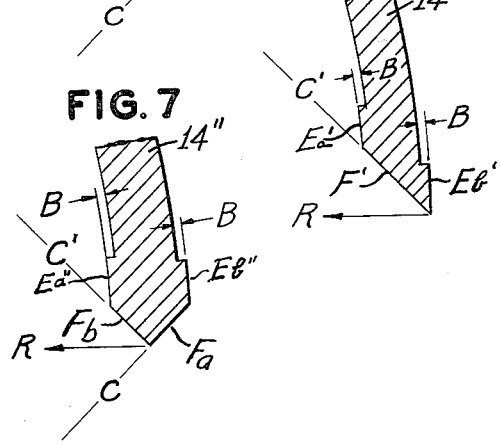
FIG. 7
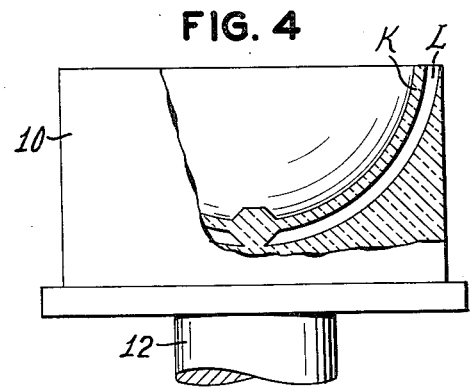
FIG. 4
INVENTOR.
MORTON S. LIPKINS
BY
Paul S. Martin
ATTORNEY United States Patent Office 3,088,254
Patented May 7, 1963

3,088,254
SPHERICAL CUTTING METHOD
Morton S. Lipkins, 3 Nemeth St., Malverne, N.Y.
Filed Feb. 26, 1960, Ser. No. 11,256
8 Claims. (Cl. 51—283)

The present invention relates to methods for making spherical shapes of hard, frangible materials. A divisional application has been filed covering apparatus aspects of the present disclosure. In my copending application, Serial No. 795,212, filed Feb. 24, 1959, it is shown that great economy of both time and material can be realized through application of a spherical cutter to this purpose. The material involved may be quite expensive and the waste pieces may have high salvage value, whereas, if the whole shape were formed by abrading techniques, the waste would be of much lower value, if any. Examples of such materials are synthetic sapphire and single-crystal silicon. Even where salvage of waste pieces may not be of controlling concern, it will be appreciated that use of a spherical cutter can avoid waste of much time and effort involved in abrading away large volumes of starting material to produce a spherical shape, such as a hollow dome.

A particular problem is involved in the making of spherical cuts in hard and brittle materials, which is solved in one manner in my previous application, mentioned above. The spherical cut is there made by supporting a spherical cutter for rotation about its axis, and the workpiece is arranged for slow rotational drive about an axis perpendicular to the exposed face of the workpiece, the two axes intersecting at the spherical center of the cutting tool. The cutter is not only rotated about its own axis, but the angle between the cutter axis and the rotational axis of the work is progressively changed as the cutter penetrates into the work. Ultimately, a connecting neck of material remains which provides support for the convex-surfaced portion of the material. When the cut has progressed to the point that the supporting neck can no longer be relied on for sufficient strength, additional support is provided for the portion of material that is carried by this neck. When this is done, the cut-off operation may be completed. Supplementary support for the inner convex portion is provided, according to my previous application, by using cement between the inner and outer walls of the cut or at any other suitable position. Thereafter, rotation of the work being interrupted, rotation of the cutting tool continues with progressive penetration, until the cut-off is complete.

The foregoing method is useful for both hypo-spherical and hyper-spherical shapes to be cut. There is the limitation that the saw cannot penetrate into the work to the full extent of half the plane angle of the saw because the supporting shaft of the saw approaches the surface of the work and saw penetration is thus restricted. The cut-off process there disclosed includes penetration of the edge of the saw to reach and cross the axis of rotation of the work, and only then can the supporting shaft of the saw reach the surface of the workpiece. Consequently, the angle of penetration of the saw in that method is substantially less than the plane angle of the saw. The angle of penetration is less than that of the saw by an amount determined by the radius of the supporting shaft of the cutter and by the diameter of the connecting neck of material that must be cut away after rotation of the workpiece has been interrupted.

An object of the present invention is to provide a novel method of cutting spherical shapes from hard and frangible materials in which the angle of the cutter need not exceed the solid angle of the material that is to be shaped, and actually in which the solid angle of the shape to be cut may be greater than that of the saw. In more general aspect, an object of the invention is to provide a novel method of cutting spherical parts from hard and frangible materials.

Additional objects of the invention relate to the provision of a novel method utilizing novel cutters for making hollow domes of hard and brittle or frangible materials.

In carrying out the invention, as will be seen from the detailed illustrative description of the invention below, a hollow dome of hard and brittle material is formed by making two successive spherical cuts having a common spherical center using diamond-bearing cutters of the required spherical radii. The cutting operations involve rotation of a workpiece about its axis, and rotation of a spherical cutter about an axis intersecting with that of the work, the angular relationship between the two axes gradually being changed as the cutter penetrates into the work. When the penetration has proceeded to a critical point at which there is danger that the convex workpiece within the spherical cut may break off, the cutting operation is interrupted. The solid angle required of the cutter need not be any greater than this penetration plus allowance for the supporting shaft of the cutter. At the time that the cutting operation is interrupted, the supporting shaft of the spherical cutter may be at or very close to the surface of the work.

The spherical cutter is removed from the cut, and the convex portion of the cut or piece is broken away from the concave portion. Thereafter, whether the spherical surface desired is on the convex workpiece or on the concave workpiece, the fractured area is finished by any conventional spherical grinding operation.

It is important for the break to be a controlled one. According to a further feature of the invention, as is disclosed below, the advancing cutting edge of the spherical cutter is formed to produce a constriction in the connecting neck that is spaced from the desired spherical surface. The disclosed cutters have edges of conical form, the elements of such cone being disposed at a substantial angle relative to the radius to the spherical center. As a result, when the cutter has proceeded to the maximum depth of penetration leaving only a minimum connecting neck of material, that neck will be conical in shape. By using a conical cutting edge that slopes in the right direction, the narrow end of the conical connecting neck may be made remote from the part that is to be saved. In making a hollow dome, two different conical-edged spherical cutters are used, such that the connecting neck between the dome and each portion cut away from the dome has its narrowest cross-section remote from the dome surface. In each instance, when the connecting neck is broken, the fracture occurs at or close to the narrowest cross-section of the neck, providing assurance that the fracture will not extend to the desired spherical surfaces of the dome. The residual conical projections at the inside and outside of the dome cut in the foregoing manner are removed by conventional lens-grinding techniques for completing the spherical surfaces in the regions of the broken-away conical supporting necks.

In the preferred embodiment of the invention discussed below in detail, the cutters which form the desired constriction in the diameter of the neck are used for the entire cutting operation. However, it is apparent that the cutting operation could be carried out in two phases, at first using any desired cutter and, when the cut is to be concluded, a different cutter may be used having an edge whose cross-sectional contour will produce the break-controlling construction in the neck considered above. The cutter described below are preferred since they are effective for the entire operation, without interruption;

but such cutters could be used in only the final constriction-forming phase if some other cutter is preferred for the first phase.

In the preferred embodiment detailed below, the cutters have diamond-bearing cutting faces. Where permissible, this may be replaced by a "mud" or slurry containing a grit such as Carborundum that is fed to the cutting edge, and such substitution is within present contemplation.

The nature of the invention and further features of novelty will be better appreciated from the following description of an illustrative embodiment of the invention shown in the accompanying drawings. In those drawings:

FIG. 1 is a cross-sectional view of a dome which is to be made;

FIG. 2 is a diagrammatic view, partly in cross-section, of a cutting operation in progress, including the cutting tool, the work, and its support;

FIGS. 3 and 4 are fragmentary lateral views of the workpiece at the completion of the first cut and second cut, respectively;

FIGS. 5 and 6 are greatly enlarged cross-sectional views showing cutting edge details of two spherical cutters utilized in making the cuts of FIGS. 3 and 4, respectively; and FIG. 7 is a similar view of a modified cutting edge.

Referring now to the drawings, there is shown a cylindrical workpiece 10 with its axis vertical and supported on a rotary carrier 12 for engagement by a spherical cutter 14 that is carried by shaft 16. The material 10 may be any of various hard and brittle materials, such as synthetic sapphire, single-crystal silicon, glass, quartz, silicon carbide and the like. By means of suitable supporting and drive structure such as that in my copending application, Serial No. 795,212, mentioned above, the spherical cutter is rotated rapidly about its shaft 16 while its axis is swung from nearly vertical to nearly horizontal attitude. The swing of the axis proceeds slowly, as the cutter penetrates into the work. The support 12 rotates gradually, and as the cutter penetrates into the work, it forms a spherical cut of progressively increasing depth. The maximum penetration of the cutter into the work is limited by interference between shaft 16 and the surface of the work. In any event, the cutting operation is interrupted when the cutting edge has reached a point where, if the cutting were to proceed, there would be serious danger of the workpiece breaking off accidentally.

The angle of the cut may be readily measured in terms of the plane angle $\theta$ is a finished dome in FIG. 1, made by two successive cuts represented in FIGS. 3 and 4. The angle $\theta$, in accordance with the present invention, may be as much as or perhaps even larger than the corresponding plane angle of the spherical cutters used. This is because, even though the shaft 16 cannot swing any farther than is permitted by the top surface of the workpiece, nevertheless the diameter of the supporting neck left at the end of the cut-off operation compensates approximately for the shaft diameter. It is actually possible to make a true complete hemisphere using a hemispherical cutter, despite the interference between the supporting shaft 16 and the surface of the workpiece.

As seen in FIGS. 3 and 4, two cuts of different spherical radii are made using two different cutters in order to make the near-hemispherical dome of FIG. 1. After each cut has been carried as far as practicable, the remaining supporting neck is broken for separating the convex portion from the concave portion of that cut.

While it is preferred to make the inside cut first and the outside cut second, as illustrated in FIGS. 3 and 4, it is feasible to reverse this sequence. The illustrated sequence is preferred because in this way it is necessary to mount the workpiece only once, and assurance is had that the rotational axis is the same for both cuts.

As illustrated in FIG. 5, the enlarged cross-section of the cutting-edge detail of one of the cutters involves a cutting surface F which is conical in form, the geometric conical elements or lines C of the conical surface extending through the rotational axis of the tool and making a substantial angle with the radius R that extends to the spherical center of the cutter. The wall thickness A of the cutter is smaller than the maximum projected width of the cutting surface (projected along radius R) because an overhang B is provided both at the inside surface and at the outside surface of wall A. The conical cutting surface F has embedded diamond cutting material, as is true too of the lateral faces E$a$ and E$b$.

Cutter 14 is operated as represented in FIG. 2 for gradually forming a spherical cut G into the body of the material 10, leaving a convex portion H. The cutter of FIG. 5 is preferably used first. Because there is a prominent angle between the conical cutting face F relative to the outer lateral surface E$b$, the conical connecting neck J which supports portion H has a broad base and has a minimum diameter D that is spaced from the desired concave spherical surface that is to become the inside of the dome in FIG. 1. The inner lateral surface E$a$ of the cutter in FIG. 1 intersects with the conical cutting face F to define an edge, the plane angle between the straight-line elements in surface E$a$ and the cutting face F departing substantially from a right angle, 45° for example. When the cut of FIG. 2 is complete (FIG. 3) the inside convex portion can be broken, with assurance that the fracture will be a controlled one. The remaining portion of the connecting neck is subsequently removed by usual spherical grinding techniques.

In FIG. 6 another cutter 14′ is shown, having a conical face F′ and lateral surfaces E$a$′ and E$b$′ having overhang clearances B from the supporting wall of the cutter. The conical element C′ has a reverse slant compared to that of conical element C in FIG. 5. An edge is defined by the intersection of surface E$b$′ and cutting face F′, the included angle here, too, being 45° in an example. The obtuse angle at E$a$′ and F′ produces a broad-base neck joining dome K to body 10 (FIG. 4) with a constriction spaced from the convex surface of the dome by a safe minimum for safe fracturing when dome K is broken away. When this occurs, and when the remaining part of the neck is removed by spherical grinding, the continuous inside and outside spherical surfaces are complete.

The effective radius of cutter surface E$a$′ (FIG. 6) is larger than the effective radius of outer surface E$b$ of cutter 14 (FIG. 5) by the wall thickness of the dome, due allowance being made for clearance between the cut surface and the lateral surface of the cutter.

The slanting cutting faces of the tools in FIGS. 5 and 6 have edges that project well in advance of the lateral surfaces E$b$ and E$a$′, in the direction of cutter penetration into the work, so that a broad based supporting neck is formed, spaced from a constriction at which the controlled parting fracture starts. However, a doubly conical cutting face can be used (FIG. 7) if preferred; and other variants may likewise be found useful for the purposes here involved. These and other modifications and varied application of the invention in its various aspects will be suggested by the foregoing to those skilled in the art. Accordingly, the invention should be broadly construed, consistent with its full spirit and scope.

What is claimed is:

1. The method of making a spherical cut in hard and frangible material, including the steps of rotating a spherical cutter with a diamond-bearing rim in contact with a body of the material while rotating said body relatively slower than the cutter about an axis intersecting with the rotational axis of the cutter, the cutting face of the rim having a prominently projecting portion relative to the portion adjacent at least one of the lateral faces thereof, progressively increasing the angle between the cutter axis and the body rotational axis until only a neck remains connecting the convex and the concave body portions, the neck thereby having a reduced-diameter portion and a larger-diameter portion, breaking said connecting neck and thereby parting said body portions so that one of the body portions has a spherical surface surrounding a residual neck portion, and abrading away said neck portion so as to form a continuous spherical extension of said surrounding spherical surface.

2. The method of making a spherical dome of hard and frangible material, including the steps of successively making spherical cuts of different inner and outer spherical diameters in a body of such material so as to leave a spherical wall between the cuts, the making of each cut including the steps of rotating a spherical cutter with a diamond-bearing rim in contact with the body of material, rotating the body so that the contact of the rim moves in a circle and forms a circular cut, and progressively changing the cutter axis to increase the extent of cutter penetration until only a neck remains, forming a reduced-diameter neck portion spaced from the surrounding spherical wall surface, breaking said connecting necks and leaving a residual neck portion surrounded by a spherical wall surface inside and outside the spherical wall, and abrading away said residual neck portions so as to form continuous spherical surface extensions of said spherical wall surfaces.

3. The method of manufacturing a spherical article of hard and frangible material, including the steps of rotating a spherical cutter having a conical-faced diamond-bearing cutting rim in contact with a body of the material, advancing the point of contact in a circle, the angle of the conical face being such as to cause substantially different amounts of penetration at the inner and outer diameters of the cut, progressively increasing the penetration of the cutter into the body until only a connecting neck remains between a convex portion and a concave portion of said body, and the neck being of conical proportions with prominently different minimum and maximum diameters, and breaking said neck to effect parting of said body portions in a break spaced from said maximum-diameter neck portion.

4. The method of making a spherical-shaped article of hard and brittle material, including the steps of forming a spherical surface by rotating a spherical cutter having a cutting rim provided with abrasive grit in contact with a body of such material and moving the contact in a circle gradually while more gradually increasing the cutter penetration until only a connecting neck remains surrounded by a spherical surface, breaking the neck to leave a residual neck portion surrounded by the spherical surface, and abrading said residual neck portion away so as to extend the spherical surface across the area previously occupied by the neck.

5. The method of making a spherical-shaped article of hard and brittle material, including the steps of forming a spherical surface by rotating a spherical cutter having a cutting rim provided with abrasive grit in contact with a body of such material and moving the contact in a circle gradually while more gradually increasing the cutter penetration until only a connecting neck remains surrounded by a spherical surface, cutting a break-controlling constriction in said connecting neck at a point spaced from said spherical surface, breaking the neck to leave a residual neck portion surrounded by the spherical surface, and abrading said residual neck portion away so as to extend the spherical surface across the area previously occupied by the neck.

6. The method of making a spherical cut in a body of sapphire or equivalent hard and brittle material, including the steps of grinding a circular groove into said body of progressively greater depth, varying the diameter of the circular groove as the depth increases so as to form a spherical cut that defines two portions of the body inside and outside the cut, respectively, while maintaining the bottom surface of the groove thus ground as a figure of revolution that intersects at an acute angle with radii from the center of the spherical cut to the bottom of the groove, interrupting the grinding operation before said two portions are completely separated so that said portions of said body remain connected by a neck whose lateral surface is the bottom surface of the groove and different parts of the neck therefore having transverse cross-sections of prominently different diameters including a minimum-diameter part, stressing the neck sufficiently to produce a break that normally occurs at said minimum-diameter part, and grinding away the residual portion of the neck that remains projecting from at least one of said portions of said body.

7. The method in accordance with claim 6 where the grinding is conducted in a manner to form said neck with a conical lateral surface having a minimum-diameter part that is spaced appreciably from an adjoining lateral spherical surface that constitutes one side of the groove.

8. The method of making a spherical dome of relatively hard and brittle material such as sapphire, silicon and the like, including the steps of grinding successive coaxial and axially spaced spherical grooves into said body so as to form a dome between such spherical grooves and respective body portions inside and outside said dome, each groove-grinding operation being interrupted before completion of cut-off so that said dome remains connected by a respective neck to a corresponding one of said portions of said body, grinding a reduced-diameter portion in each said neck spaced substantially from said dome, breaking each connecting neck substantially at the reduced-diameter portion thereof so that residual neck portions remain extending from said dome, and abrading away said residual neck portions.

References Cited in the file of this patent

UNITED STATES PATENTS

| | | |
|---|---|---|
| 335,890 | Call | Feb. 9, 1886 |
| 2,183,759 | Wildhaber | Dec. 19, 1939 |
| 2,334,453 | Swofford | Nov. 6, 1943 |
| 2,609,644 | Brown | Sept. 9, 1952 |
| 2,775,854 | Klingspor | Jan. 1, 1957 |
| 2,818,697 | Block | Jan. 7, 1958 |
| 2,836,939 | White | June 3, 1958 |

FOREIGN PATENTS

| | | |
|---|---|---|
| 7,452 of 1885 | Great Britain | June 18, 1885 |